United States Patent
Shimizu et al.

(10) Patent No.: US 9,041,322 B2
(45) Date of Patent: May 26, 2015

(54) ELECTRIC POWER TOOL

(75) Inventors: Hidenori Shimizu, Shiga (JP); Masaaki Sakaue, Shiga (JP); Naotake Tanaka, Shiga (JP); Masaki Ikeda, Shiga (JP); Masaaki Okada, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 434 days.

(21) Appl. No.: 13/634,361

(22) PCT Filed: Mar. 18, 2011

(86) PCT No.: PCT/JP2011/056555
§ 371 (c)(1),
(2), (4) Date: Sep. 12, 2012

(87) PCT Pub. No.: WO2011/118523
PCT Pub. Date: Sep. 29, 2011

(65) Prior Publication Data
US 2013/0002175 A1    Jan. 3, 2013

(30) Foreign Application Priority Data
Mar. 26, 2010  (JP) .................... 2010-073586

(51) Int. Cl.
*H02P 1/00*     (2006.01)
*B25F 5/02*     (2006.01)

(52) U.S. Cl.
CPC ...................... *B25F 5/02* (2013.01)

(58) Field of Classification Search
USPC ............ 318/139, 400.01, 701, 727, 700, 318/400.26, 400.27, 400.28; 320/103, 107, 320/112, 114, 115, 140, 152, 155, 116, 136, 320/158; 439/155, 287, 341, 352
See application file for complete search history.

(56) References Cited

U.S. PATENT DOCUMENTS

| | | | |
|---|---|---|---|
| 7,567,058 B2 * | 7/2009 | Shimizu et al. | 320/114 |
| 8,237,404 B2 * | 8/2012 | Takano et al. | 320/114 |
| 2006/0268504 A1 | 11/2006 | Shimizu et al. | |
| 2009/0108806 A1 * | 4/2009 | Takano et al. | 320/112 |

FOREIGN PATENT DOCUMENTS

| | | |
|---|---|---|
| JP | 2002-027675 | 1/2002 |
| JP | 2005-040996 | 2/2005 |
| JP | 2006-326765 | 12/2006 |
| JP | 2007-144813 | 6/2007 |
| JP | 2008-178278 | 7/2008 |

* cited by examiner

*Primary Examiner* — Antony M Paul
(74) *Attorney, Agent, or Firm* — Greenblum & Bernstein, P.L.C.

(57) ABSTRACT

An electric power tool is included in a plurality of types of electric power tools. The plurality of types of electric power tools comprise a plurality of types of battery packs having different rated output voltages and a plurality of types of tool bodies, the housings of which are equipped with an attached part on which each of the battery packs is mounted in a freely removable manner. The attached part possessed by the plurality of types of tool bodies equipped with motors having different voltage characteristics is formed so as to be able to mount an arbitrary one of the plurality of types of battery packs having different rated output voltages. This makes it possible to widen the range of available battery packs and enhance convenience.

10 Claims, 9 Drawing Sheets

ELECTRIC POWER TOOL

TECHNICAL FIELD

The invention relates to an electric power tool of which power supply is a detachable battery pack.

BACKGROUND ART

An electric power tool includes a motor with output just for that purpose and, if its own power supply is a detachable battery pack, is equipped with a battery pack for a voltage and a capacity corresponding to the motor output. Therefore, different electric power tools each require battery packs corresponding to their own voltages and capacitors.

Japanese Patent Application Publication Number 2002-027675 (hereinafter referred to as a "document 1") discloses an electric power tool capable of being equipped with a battery pack, which is not just original one, of such different battery packs as long as satisfying a voltage condition.

When a rated output voltage of an original battery pack for an electric power tool is "A", the tool shown in the document 1 can be equipped with a battery pack of which rated output voltage is equal to or less than "A".

It is preferable from a safety point of view that a high order battery pack of which voltage is higher than that of an original battery pack cannot be equipped. However, it is impossible to respond to a request of use of such a high order battery pack just for a short time even if the high order battery pack is around when an original battery pack runs down.

SUMMARY OF INVENTION

The present invention is provided in view of the issues described above, and an object is to provide an electric power tool having a high convenience by expanding a utilizable range of a battery pack.

The present invention is an electric power tool comprising a battery pack, and a tool body configured so that the battery pack is detachably attached to the tool body. The tool body is configured to be joined to: any one of a plurality of types of battery packs having different rated output voltages; or a battery pack having a rated output voltage higher than that compliant to the tool body, of said plurality of types of battery packs. A battery pack attached to the tool body is configured to supply electric power to the tool body side.

In an embodiment, said electric power tool is included in a plurality of types of electric power tools. The plurality of types of electric power tools comprise: said plurality type of battery packs, in each of which one or more battery cells are connected in series or parallel and the number of battery cells connected in series is different from each other, thereby the packs having different rated output voltages; and a plurality of tool bodies each of which comprises a housing having an attached part to which said battery pack is detachably attached. Each of the tool bodies is provided, in its own housing, with: a motor as a drive source; a drive part configured to be driven with the motor; a switch as an operation input part connected to said battery pack through battery terminals; and a control circuit configured to perform a drive control of said motor in response to an operation of the switch. The motors of said plurality of types of tool bodies have different voltage characteristics, and said attached part is configured to be joined to any one of said plurality type of battery packs having different rated output voltages. The battery pack connected to the attached part is configured to supply electric power to the tool body side through said battery terminals.

In an embodiment, in each of said plurality type of battery packs, one or more battery cells are connected in series or parallel and the number of battery cells connected in series is different from each other, thereby the packs having different rated output voltages. Said tool body comprises a housing having an attached part to which said battery pack is detachably attached. Said tool body is provided, in the housing, with: a motor as a drive source; a drive part configured to be driven with the motor; a switch as an operation input part connected to said battery pack through battery terminals; and a control circuit configured to perform a drive control of said motor in response to an operation of the switch. Said attached part of the tool body is configured to be joined to: a battery pack having a rated output voltage compliant to a characteristic of the motor in the tool body, of said plurality type of battery packs; and also another battery pack having a rated output voltage higher than that compliant to a characteristic of the motor in the tool body, of said plurality type of battery packs. The battery pack joined to the attached part is configured to supply electric power to the tool body side through said battery terminals.

In an embodiment, said electric power tool is included in a plurality of types of electric power tools. The plurality of types of electric power tools comprise: said plurality type of battery packs, in each of which one or more battery cells are connected in series or parallel and the number of battery cells connected in series is different from each other, thereby the packs having different rated output voltages; and a plurality of tool bodies each of which comprises a housing having an attached part to which said battery pack is detachably attached. Each of the tool bodies is provided, in its own housing, with: a motor as a drive source; a drive part configured to be driven with the motor; a switch as an operation input part connected to said battery pack through battery terminals; and a control circuit configured to perform a drive control of said motor in response to an operation of the switch. The tool bodies comprise motors having different voltage characteristics, and each attached part of the tool bodies is configured to be joined to: a battery pack of a rated output voltage compliant to a characteristic of the motor built in its own tool body, of said plurality type of battery packs; and also another battery pack having a rated output voltage higher than that compliant to the characteristic of the motor in its own tool body, of said plurality type of battery packs. The battery pack joined to the attached part is configured to supply electric power to the tool body side through said battery terminals.

In an embodiment, said attached part of the tool body is further configured to be joined to a battery pack having a rated output voltage lower than that compliant to the characteristic of the motor in the tool body. The battery pack joined to the attached part is configured to supply electric power to the tool body side through said battery terminals.

In an embodiment, said attached part of the tool body is further configured to prohibit a battery pack, having a rated output voltage larger than a rated output voltage compliant to the characteristic of the motor in the tool body by at least a predetermined voltage difference, from being joined to the attached part.

In an embodiment, said battery pack comprises an attachment part having a plurality of engaging parts which are configured to be mechanically joined to a plurality of engaged parts of the attached part of the tool body, respectively. Said engaging parts of the attachment part comprise insert limiting parts configured to allow the engaged parts to be inserted into the engaging parts only in a direction that the attachment part of the battery pack and the attached part of the tool body are pressed to each other. In an example, at least one of the engaging parts comprises different dimension in accordance with rated output voltages of battery packs, and at least one of the engaged parts comprises different dimension in accordance with characteristics of the motors in tool bodies, thereby limiting battery packs joined to said tool body.

In an embodiment, said battery pack comprise a battery cell of a lithium-ion battery. A battery pack capable of being joined to the attached part of the tool body is: a battery pack having a rated output voltage compliant to a characteristic of the motor in the tool body; and a battery pack having a rated output voltage, a difference between the rated output voltage and the rated output voltage compliant to the characteristic of the motor in the tool body being a voltage of one battery cell.

In the present invention, it is possible to combine a plurality of types of battery packs having different rated output voltages and a plurality of types of tool bodies comprising motors having different voltage characteristics, thereby highly improving convenience in use.

BRIEF DESCRIPTION OF DRAWINGS

Preferred embodiments of the invention will now be described in further details. Other features and advantages of the present invention will become better understood with regard to the following detailed description and accompanying drawings where.

DESCRIPTION OF EMBODIMENTS

Figure 1:
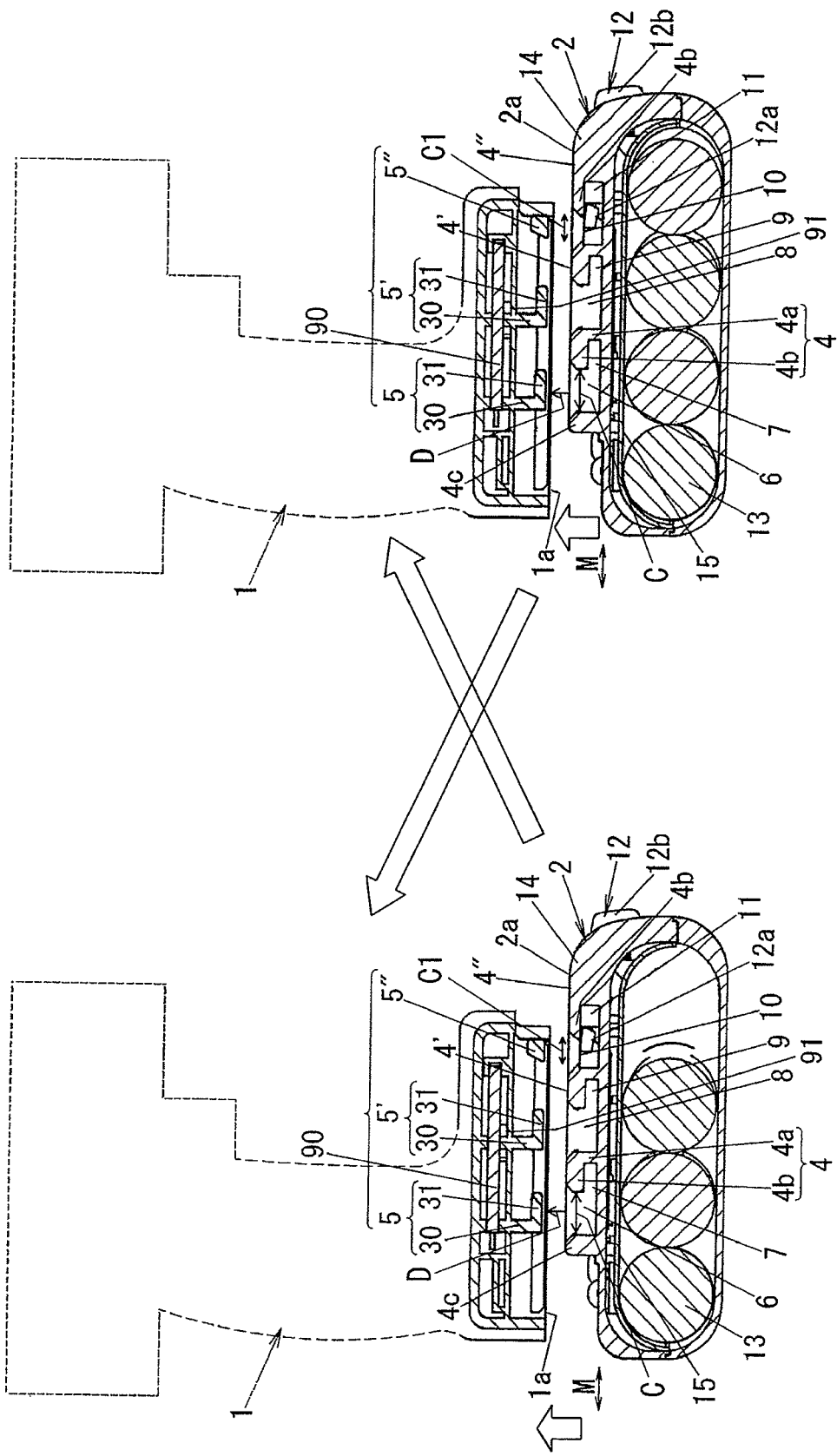
FIG. 1 is an explanatory diagram of an example in an embodiment of the present invention.

An example in an embodiment of the present invention is explained in detail. An electric power tool in an embodiment of the present invention is formed of a tool body 1 of an impact driver or the like, and a battery pack 2 detachably attached to the tool body 1. The battery cells 13 connected in series are built in the battery pack 2 that has double structure in which an inner case 15 covering the battery cells 13 is capped with an outer case 14. A superior part of the outer case 14 is an attachment part 2a with respect to the tool body 1. In addition, the attachment part 2a is also used for attachment to a battery charger (not shown).

The attachment part 2a is first explained with reference to FIGS. 2 and 3. L-shaped engaging parts 4, 4', 4" are located three each at both sides of the attachment part 2a in order to mechanically join the tool body 1 to both sides of the attachment part 2a. In the example, the L-shaped engaging parts 4, 4', 4" are formed so that one rib-shaped engaging part 4c and three L-shaped engaging parts 4, 4', 4" are spaced in a longitudinal direction (M) of the attachment part 2a (a front-back direction of the electric power tool). Three L-shaped engaging parts 4, 4', 4" are stuck out at even intervals from a rib-shaped engaging part 4c at an one end side (a back side) to the other side (a front side) in the longitudinal direction (M).

The rib-shaped engaging parts 4c are extended perpendicular to the attachment part 2a (the superior part of the outer case 14). Each of L-shaped engaging parts 4, 4' is formed of an insert limiting part 4a extended perpendicular to the attachment part 2a, and an attachment retainer 4b having an opening in an orthogonal direction with respect to the insert limiting part 4a. An L-shaped engaging part 4" is also formed of an insert limiting part 4a and an attachment retainer 4b as previously described, and a hook engaging part 12a configured to releasably latch an engaged part 5 moved from the insert limiting parts 4a to the attachment retainers 4b.

As shown in FIG. 1, a first vertical hole 6 and a first horizontal hollow 7 continued to the hole are formed at an inner side of an L-shaped engaging part 4. A second vertical hole 8 and a second horizontal hollow 9 continued to the hole are formed at an inner side of an L-shaped engaging part 4'. A third vertical hole 10 and a third horizontal hollow 11 continued to the hole are formed at an inner side of an L-shaped engaging part 4".

A hook 12 is placed in a hollow space between the outer case 14 and the inner case 15. Fulcrum points 12c pivotably supported by the outer case 14 are placed at a base end of the hook 12. A handle portion 12b exposed to the outside of the outer case 14 is placed at a center side of the hook 12. A fore-end side of the hook 12 is bifurcated into two segments at both fore-ends of which the hook engaging parts 12a are placed, respectively. One of the hook engaging parts 12a is placed inside one of the L-shaped engaging parts 4" of the attachment part 2a, and the other of the hook engaging parts 12a is placed inside the other of the L-shaped engaging parts 4".

The handle portion 12b of the hook 12 is biased toward a direction (an upper direction in FIG. 3) approaching an inner face of the outer case 14 with a return spring of a compression spring (not shown). Thereby, parts of the hook engaging parts 12a are in elastic contact with the inner faces of the attachment retainers 4b of the L-shaped engaging parts 4". When the handle portion 12b is pushed manually or the hook engaging parts 12a are pushed with a convex engaged part 5", to be described, in the tool body 1, the hook 12 is pivoted, in the teeth of a spring force of the return spring, in a direction (a downward direction in FIG. 5) that the hook 12 moves away from the inner face of the outer case 14, and the hook engaging parts 12a are pressed into bottom sides of the insert limiting parts 4a. This allows the convex engaged parts 5" to engage with the L-shaped engaging parts 4".

In addition, no hook engaging part 12a is placed at each inner side of the L-shaped engaging parts 4, 4". L-shaped engaged parts 5, 5' of the tool body 1 corresponding to the L-shaped engaging parts 4, 4' can be engaged or released without limitation of the hook 12.

Figure 2:
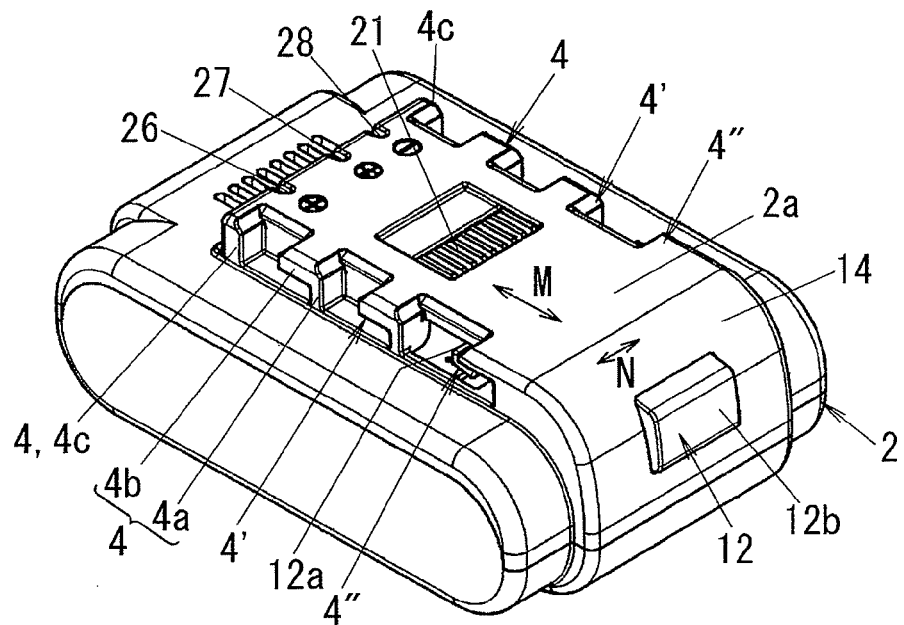
FIG. 2 is a perspective view of a basic form of a battery pack in the embodiment.
Figure 3:
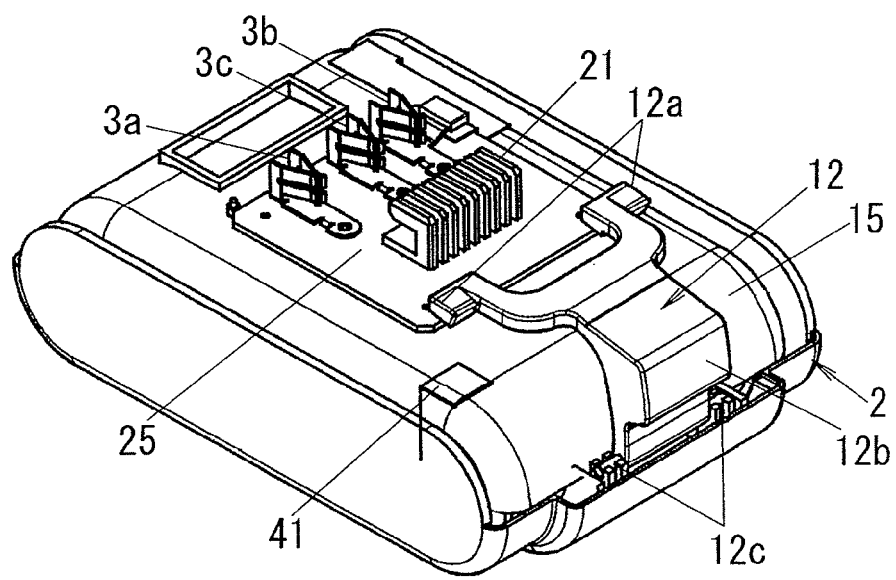
FIG. 3 is a perspective view of the embodiment with a outer case of the battery pack detached.

As shown in FIG. 2, the attachment part 2a of the outer case 14 is provided with concave portions 26-28, behind which female terminals 3a, 3b, 3c mounted on a printed board 25 fixed to the inner case 15 are arranged as shown in FIG. 3. The female terminals 3a, 3b, 3c are positive and negative terminals for charge-discharge (battery terminals) 3a, 3b, and a detector terminal 3c. Male terminals (positive and negative power terminals and a detector terminal) can be inserted into the concave portions 26-28 to be connected with the terminals 3a, 3b, 31, respectively.

The tool body 1 of the electric power tool includes a motor as a power source, a decelerating part and an output part (not shown), and has an attached part 1a, to which the battery pack 2 is attached, at the undersurface of a housing, specifically a handle part. The output part is a drive part configured to be driven with the motor. A body control circuit 90 with signal connectors 91, the male terminals and the like are placed in the attached part 1a.

Right and left rows of engaged parts 5, 5', 5" are placed at both sides of the attached part 1a, and correspond to right and left rows of L-shaped engaging parts 4, 4', 4" placed at both sides of the attachment part 2a of the battery pack 2, respectively. In the example, the engaged parts 5, 5', 5" are formed of L-shaped engaged parts 5, 5' corresponding to the L-shaped engaging parts 4, 4' of the battery pack 2, respectively, and convex engaged parts 5" corresponding to the L-shaped engaging parts 4". Each of the L-shaped engaged parts 5, 5' is formed of a vertical rib 30 and a horizontal rib 31 capable of engaging with the L-shaped engaging parts 4, 4' of the battery pack 2 in the form of a hook type.

An attachment procedure is explained. As shown in FIG. 1, before attachment, the hook engaging parts 12a are in elastic contact with the inner faces of the L-shaped engaging parts 4", and the parts of the hook engaging parts 12a are exposed in the third vertical holes 10. If the attached part 1a of the tool body 1 and the attachment part 2a of the battery pack 2 are attached in a direction (D) that they are pressed to each other, the engaged parts 5, 5', 5" of the tool body 1 are inserted into the L-shaped engaging parts 4, 4', 4" of the battery pack 2, respectively. Meanwhile, by depressing the hook engaging parts 12a with the convex engaged parts 5", the hook 12 pivots downward so as to draw an arc on central points of the fulcrum points 12c, and the hook engaging parts 12a are pushed into the bottom sides of the insert limiting parts 4a.

If the battery pack 2 is then slid with respect to the tool body 1 in the direction (M) perpendicular to the direction (D) pushed as stated above, all the engaged parts 5 are inserted into the attachment retainers 4b. Meanwhile, pressing forces of the hook engaging parts 12a by the convex engaged parts 5" are released, and accordingly the hook engaging parts 12a return to the original position by action of a hook spring (not shown) located between the inner case 15 and the reverse side of the handle portion 12b. As a result, the convex engaged parts 5" are retained with the hook engaging parts 12a, and all the engaged parts 5 are held with the attachment retainers 4b, thereby rigidly joining the battery pack 2 and the tool body 1.

In detachment of the battery pack 2, if the handle portion 12b of the hook 12 is pushed with a finger so that the hook 12 is pivoted downward so as to draw an arc on central points of the fulcrum points 12c, the hook engaging parts 12a are again inserted into the bottom sides of the insert limiting parts 4a. If any one of the tool body 1 or the battery pack 2 is then slid, the battery pack 2 can be detached from the tool body 1.

In the example, as shown in FIG. 1, each front-back dimension (C) of the first vertical holes 6 and each front-back dimension (C) of the second vertical holes 8 in the battery pack 2 are the same dimension. Each front-back dimension of the L-shaped engaged parts 5 and 5' in the tool body 1 of the electric power tool is set in accordance with the front-back dimension (C). Each front-back dimension (C1) of the third vertical holes 10 in the battery pack 2 is shorter than the front-back dimension (C). Each front-back dimension of the convex engaged parts 5" in the tool body 1 of the electric power tool is set in accordance with the front-back dimension (C1). For this reason, the convex engaged parts 5" in the tool body 1 can be inserted into only the third vertical holes 10 in the battery pack 2. It is therefore possible to prevent wrong attachment of the engaging parts 4 in the battery pack 2 to the engaged parts 5 in the tool body 1 of the electric power tool.

In the example, it is possible to limit battery pack's (2) types capable of being attached to the tool body 1 through the six engaged parts 5, 5', 5" at both sides of the tool body 1 and the six engaging parts 4, 4', 4" at both sides of the battery pack 2.

That is, there are different battery packs 2 (2A, 2B, 2C) of which rated output voltages are different from each other because the number of battery cells 13 connected in series in each of the packs is different from each other. There are different tool bodies 1 (1A, 1B, 1C) of which built-in motors $M_A$, $M_B$ and $M_C$ have voltage characteristic different from each other. In this instance, a battery pack 2 having a rated output voltage compliant to a tool body 1 is attached to the body and used. In the embodiment, the tool body 1 is configured: to be joined to a battery pack 2 having a rated output voltage higher than the compliant rated output voltage by a voltage difference of one battery cell 13 in addition to the battery pack 2 having the aforementioned compliant rated output voltage; and to be prohibited from being joined to battery packs 2 having other rated output voltages, for the case that a battery pack(s) having a compliant rated output voltage runs down, or for the case that although work at a high output is required temporarily, it is impossible to perform such work with a battery pack 2 having the compliant rated output voltage.

Specifically, in the six engaging parts 4, 4', 4" of the battery pack 2, right and left widths of the first vertical holes 6 of the engaging parts 4 and the second vertical holes 8 of the engaging parts 4' are set in accordance with a rated output voltage of the battery pack 2. In the engaged parts 5, 5', 5" of the tool body 1, right and left widths of the engaged parts 5, 5' are set in accordance with a built-in motor's characteristic.

FIG. 5 shows an example. In the engaged parts 5, 5' ($5_A$, $5'_A$) of a tool body 1 (1A) of which compliant battery pack 2 (2A) is a battery pack of 14.4V, only the right engaged part 5 ($5_A$) has a wider right and left width. In the engaged parts 5, 5' ($5_B$, $5'_B$) of a tool body 1 (1B) of which compliant battery pack 30 2 (2B) is a battery pack of 18V, only the left engaged part 5 ($5_B$) has a wider right and left width. In the engaged parts 5, 5' ($5_C$, $5'_C$) of a tool body 1 (1C) of which compliant battery pack 2 (2C) is a battery pack of 21.6V, only the right 8 engaged part 5 ($5_C$) has a wider right and left width.

Figure 5A:
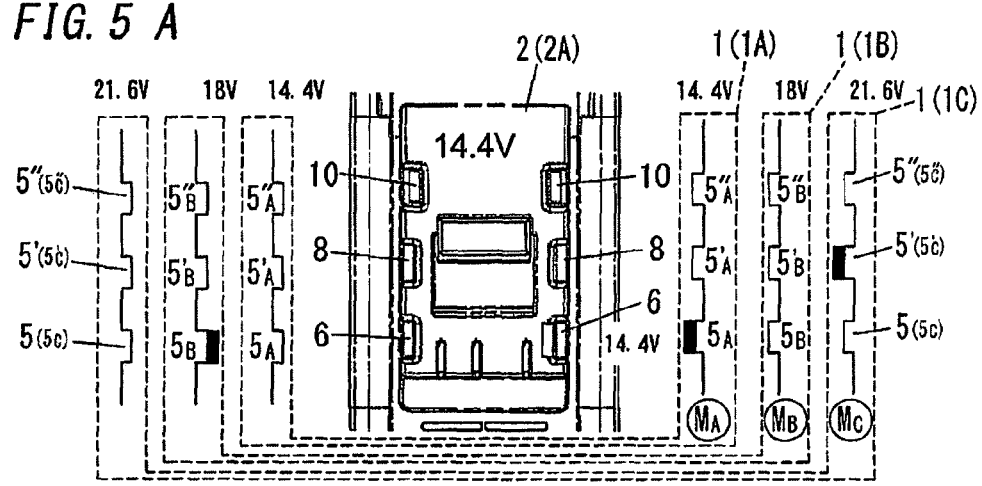
FIGS. 5A, 5B and 5C are explanatory diagrams of right and wrong attachment of the battery packs in the embodiment.
Figure 5B:
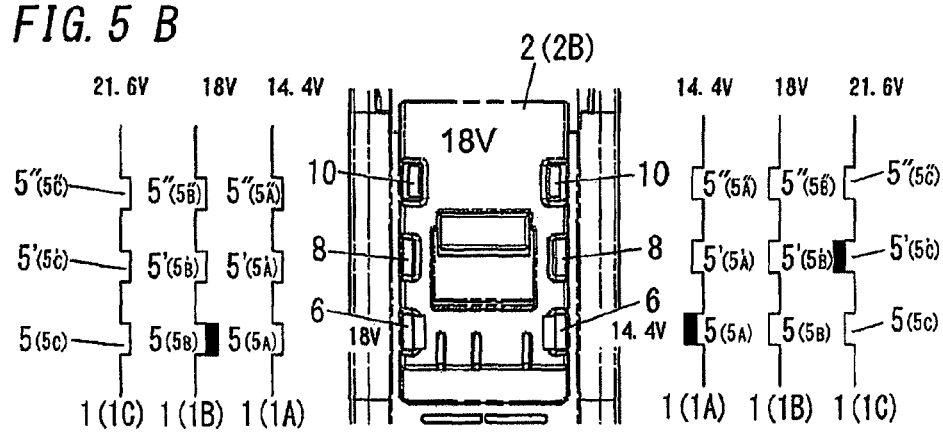
Figure 5C:
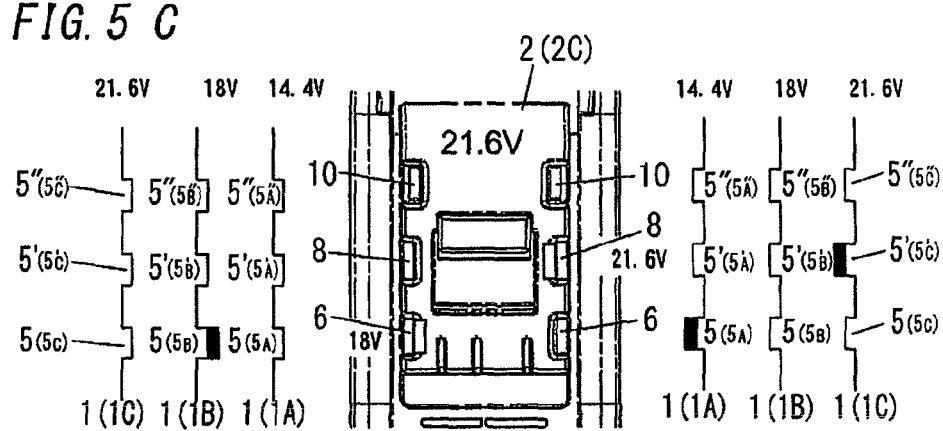

As shown in FIG. 5A, in the battery pack which has four lithium-ion battery cells 13 connected in series and a rated output voltage of 14.4V, only the first vertical hole 6 of the right engaging part 4 has a wider right and left width. As shown in FIG. 5B, in the battery pack which has five lithium-ion battery cells 13 connected in series and a rated output voltage of 18V, each of the first vertical hole 6 of the right engaging part 4 and the first vertical hole 6 of the left engaging part 4 has a wider right and left width. As shown in FIG. 5C, in the battery pack which has six lithium-ion battery cells 13 connected in series and a rated output voltage of 21.6V, each of the first vertical hole 6 of the left engaging part 4 and the second vertical hole 8 of the right engaging part 4' has a wider right and left width.

A engaged part 5, 5' having a wider right and left width can be engaged with only an engaging part 4, 4' having a wider right and left width, but cannot be engaged with an engaging part 4, 4' having a narrow right and left width. Therefore, in the example of FIG. 5, a tool body 1 of which compliant battery pack 2 is a battery pack of 14.4V can be joined to a battery pack 2 of which rated output voltage is 14.4V, and also a battery pack 2 of which rated output voltage is 18V, but cannot be joined to a battery pack 2 of which rated output voltage is 21.6V.

A tool body 1 of which compliant battery pack 2 is a battery pack of 18V can be joined to a battery pack 2 of which rated output voltage is 18V, and also a battery pack 2 of which rated output voltage is 21.6V, but cannot be joined to a battery pack 2 of which rated output voltage is 14.4V.

A tool body 1 of which compliant battery pack 2 is a battery pack of 21.6V can be joined to a battery pack 2 of which rated output voltage is 21.6V, but cannot be joined to a battery pack 2 of which rated output voltage is 14.4V and 18V.

That is, as a matter of course, the tool body 1 in the example can be joined to a battery pack 2 having a compliant rated output voltage, and also can be joined to a battery pack 2 which has the same kind of battery cells 13 (in the example, lithium-ion battery cells 13) and a rated output voltage higher by a voltage difference of one battery cell 13.

If a battery pack 2 of which rated output voltage is higher than a rated output voltage compliant to a tool body 1 is attached and used for a long time, there is a concern of motor's (M) burning or the like but there is no problem for a brief work if a voltage difference is approximately that of one battery cell 12.

An electric power tool has a larger output as the voltage is higher, but a high voltage type of electric power tool becomes large and heavy in the light of securing constructive durability. Users of electric power tools desire reduction in size and weight for work in which the tools are frequently used, and accordingly often use low voltage type of electric power tools. However, it is only occasionally necessary to perform heavily-loaded work such that a low voltage type of electric power tool causes deficiency in performance. In this instance, an electric power tool in the present example is compatible with a battery pack 2 having one rank higher rated output voltage, and therefore can cope with it by exchanging to a battery pack 2 having a high rated output voltage.

The embodiment shows the example that a battery pack 2 having a rated output voltage lower than a rated output voltage of a compliant battery pack 2 cannot be used, but may be configured to be joined to a battery pack 2 having one rank lower rated output voltage (the number of battery cells connected in series is smaller by one). The performance is diminished, but it is possible to well cope with light work.

It is preferable that a battery pack 2 having a fairly-high voltage difference cannot be used. Using a battery pack 2 having a fairly-large rated output voltage causes motor burn-out and excessive heat generation. If a battery pack 2 having a fairly-low rated output voltage is attached, a rotational frequency of the motor becomes too low, thereby causing difficulty in work, such as interruption of a work.

The embodiment limits compatible battery packs by different right and left widths of the engaged parts 5, 5', 5" and the engaging parts 4, 4', 4", but may be configured to limit by different back-and-forth lengths, heights or the like.

In the configuration that a battery pack 2 having a rated output voltage different from that of an original battery pack 2 can be used, over-discharge prevention countermeasure should be considered with this in mind.

The embodiment is therefore configured so that, when a battery pack 2 is attached to a tool body 1, the tool body 1 detects a type of the battery pack 2 to switch over-discharge prevention in accordance with the type of the battery pack 2.

Figure 4:
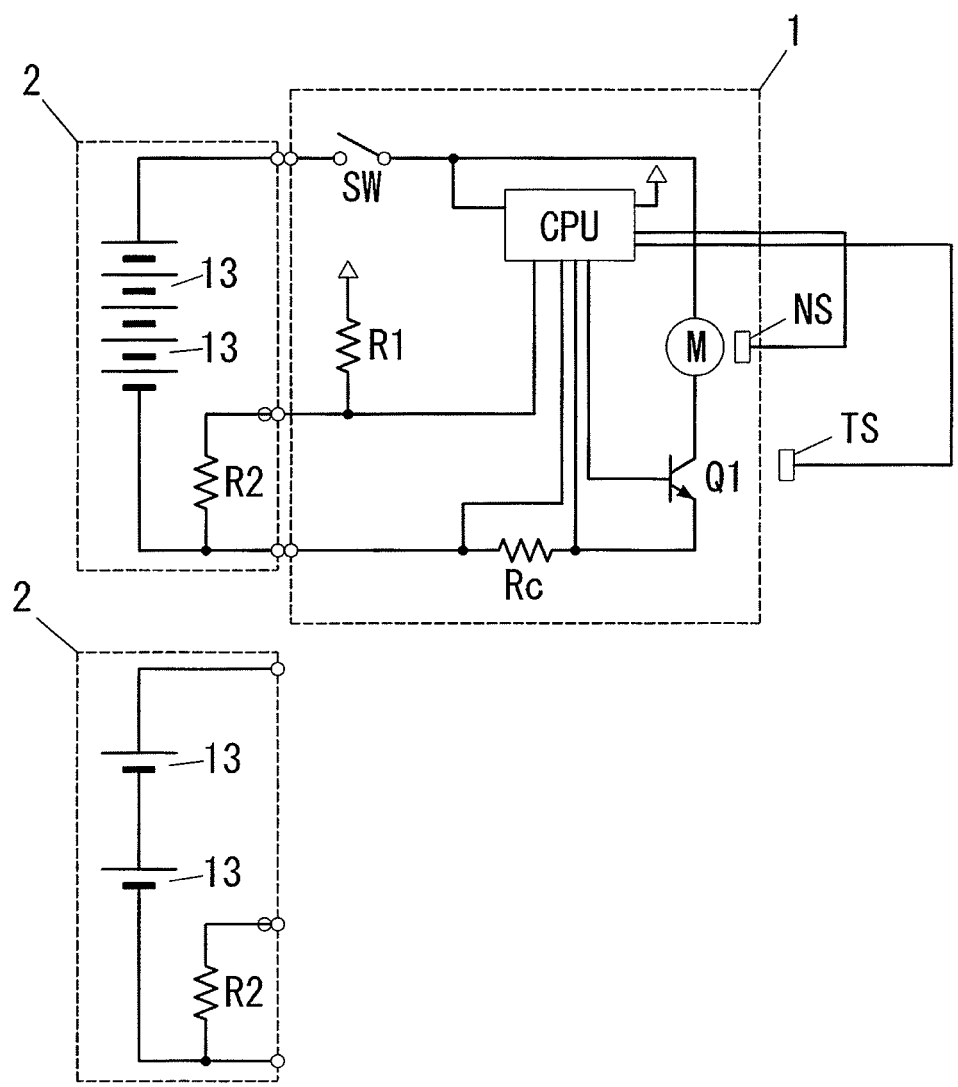
FIG. 4 is a circuit diagram of the embodiment.

That is, as shown in FIG. 4, the tool body 1 has a built-in motor (M) as a drive source and is configured to be driven with a battery pack 2 as a power supply. The tool body 1 includes an operation trigger switch (SW) (an operation input part), a control circuit (CPU) configured to control the operation of the motor (M), and an operation switching element (Q1), and also includes a revolution sensor (NS) and a temperature sensor (TS) in a housing. The temperature sensor (TS) is located adjacent to the switching element (Q1) and the motor (M).

The control circuit (CPU) is configured to obtain information of the number of revolutions from the revolution sensor (NS) and information of temperature from the temperature sensor (TS), and also detect a load of the motor (M), namely a load current value from a voltage across a current sensing resistor (Rc). In addition, the circuit is configured to detect type information of an attached battery pack 2 and a battery voltage under load.

Each of a plurality of types of battery packs 2, in each of which the number of built-in battery cells 13 connected in series is different from each other, includes a resistor (R2) having a resistance value corresponding to the number of built-in battery cells 13 connected in series. When a battery pack 2 is attached to the tool body 1, the control circuit (CPU) of the tool body 1 is configured to detect, from a voltage divider of a resistor (R1) and the resistor (R2), a type by difference of the number of battery cells 13 connected in series of an attached battery pack 2 (rated out voltage). In an example, battery packs 2 have nonvolatile memories to which their own type identification codes are written, and when a battery pack 2 is attached to the tool body 1, the control circuit (CPU) functions as a battery voltage type detecting means to read out the identification code, thereby detecting the battery pack's (2) type.

The control circuit (CPU) of the tool body 1 detects an output voltage of the battery pack 2 during discharge, and then stops the motor (M) if the voltage falls to a threshold, and thereby the tool body 1 performs over-discharge prevention. The control circuit (CPU) also has a table of thresholds corresponding to battery pack's (2) types, respectively. Based on type information of an attached battery pack 2, the control circuit (CPU) reads out a threshold corresponding to the attached battery pack 2 from the table, and performs the over-discharge prevention control based on the threshold. A discharge stop control is performed by the threshold corresponding to a rated output voltage of the attached battery pack 2, and accordingly even if a battery pack 2 having any rated output voltage is attached, it is possible to perform work with full capacity of each battery pack 2.

If a battery pack 2 having a rated output voltage higher than a compliant rated output voltage is attached, a high output is obtained, but that causes an increase of calorific value from the motor (M) and a large load onto the drive part driven with the motor (M), and a long-time operation under the state shortens the life of the tool body 1. It is preferable from that point of view that when a battery pack 2 having a rated output voltage higher than a compliant rated output voltage is attached, the control circuit (CPU) detects that state from the identification information to limit the output of the motor (M). The limitation may be performed by a PWM control if the motor (M) is a brush motor.

Figure 6:
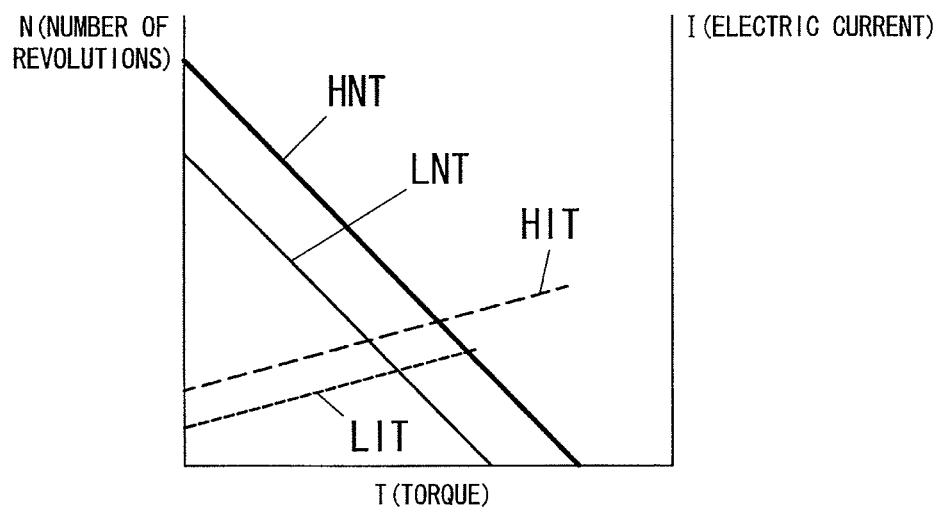
FIG. 6 is an explanatory diagram of an NT characteristic and an IT characteristic of a motor.

FIG. 6 shows motor's (M) revs-torque (NT) characteristic and current-torque (IT) characteristic. In the figure, HNT is an NT characteristic during high voltage drive, HIT is an IT characteristic during high voltage drive, LNT is an NT characteristic during low voltage (a compliant rated output voltage) drive, and LIT is an IT characteristic during low voltage drive. High voltage drive conduces to large revs and torque, thereby increasing not only an output but also heat generation.

Accordingly, the motor (M) and the drive part need to be designed to be resistant to a high voltage in ordinary circumstances, but that results in growing in size. Therefore, when a battery pack 2 of a high voltage is attached, an average of an input voltage by the PWM control is made the same as an input voltage when a battery pack 2 of a conformance voltage is attached.

Figure 7:
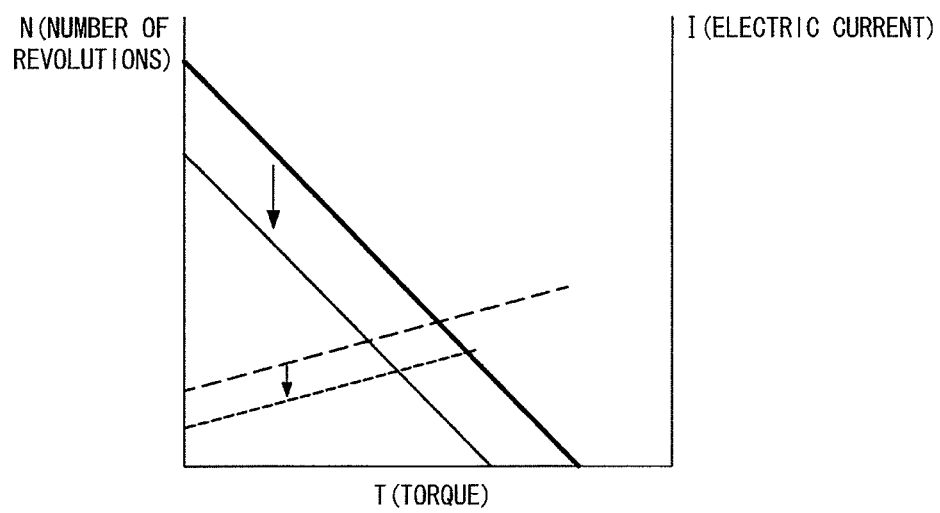
FIG. 7 is an explanatory diagram of an NT characteristic and an IT characteristic in an output limiting example of the embodiment.

Specifically, if obtaining identification information of a battery pack (P), the control circuit (CPU) measures a motor current and a battery voltage. When a battery pack 2 of a conformance voltage (and a battery pack 2 of a rated output voltage lower than that) is attached, the control circuit (CPU) does not limit in particular. When a battery pack 2 of a high voltage is attached, the control circuit (CPU) performs a PWM control so as to obtain an output in the proximity of a maximum output obtained when a compliant battery pack 2 is attached. Thereby, as shown in FIG. 7, the control circuit (CPU) makes an NT characteristic and an IT characteristic agree with LHT and LIT in FIG. 6.

Adding limitation described above is performed by previously preparing a table of voltage and electric current, judging a position of the NT characteristic or the IT characteristic based on the table, and limiting an electric current with respect to a voltage by the PWM control, or may be performed by previously preparing a table of electric current and number of revolutions, judging a position of the NT characteristic or the IT characteristic based on the table, and limiting an electric current with respect to number of revolutions by the PWM control. The limitation may be performed when temperature exceeds a predetermined value while referring temperature information.

Figure 8:
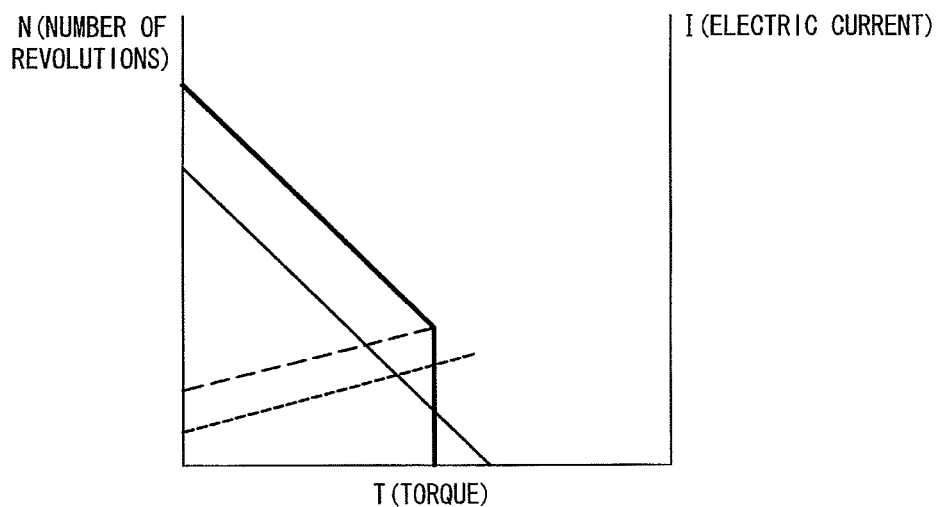
FIG. 8 is an explanatory diagram of an NT characteristic and an IT characteristic in an output limiting example of the embodiment.
Figure 9:
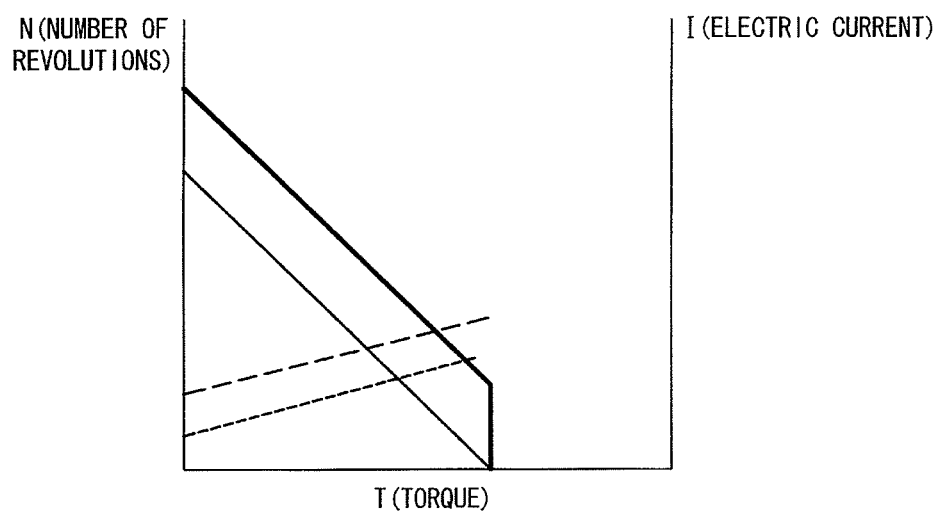
FIG. 9 is an explanatory diagram of an NT characteristic and an IT characteristic in an output limiting example of the embodiment.

Besides, the PWM control may be performed so that from a detected motor current, a heat generation agrees with that in attachment of a battery pack 2 of a low voltage, or the PWM control may be performed so that an output torque agrees with that in attachment of a low voltage pack 2. The former is preferable when suppressing heat generation is important, and the latter is preferable when stress reduction of the drive part by reducing torque is important. FIG. 8 shows an output limitation (limitation of an upper limit of a load current) for suppressing heat generation due to a high load. FIG. 9 shows an output limitation (limitation of an upper limit of a torque) for suppressing a torque.

When a high voltage is applied to the motor (M) by attaching a battery pack 2 of a high voltage, an upper limit of number of rotations may be limited in order to prevent noise or burn-in of revolution axis due to high revolution.

The limitation of number of rotations may be performed by previously preparing a table of voltage and electric current, judging a position of the NT characteristic or the IT characteristic based on the table, and limiting an electric current with respect to a voltage by the PWM control, or may be performed by previously preparing a table of electric current and number of rotations, judging a position of the NT characteristic or the IT characteristic based on the table, and limiting an electric current with respect to number of rotations by the PWM control.

Figure 10:
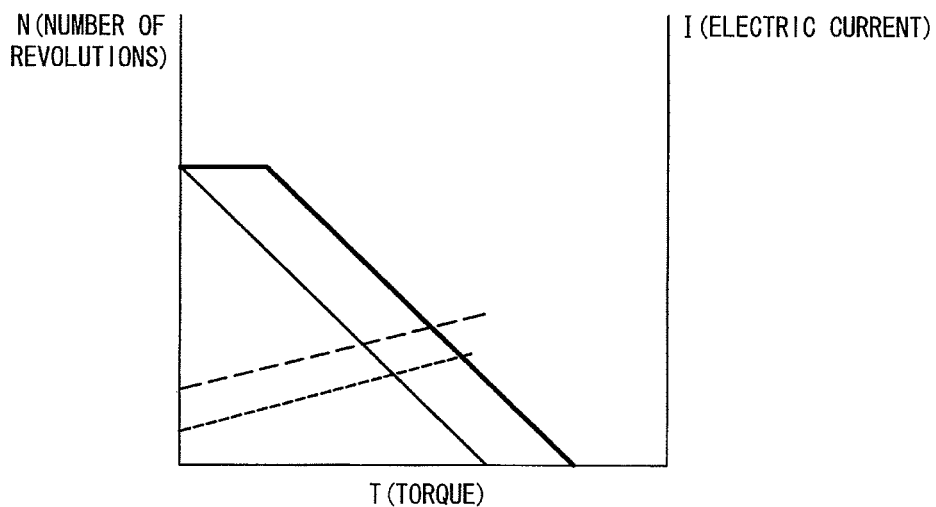
FIG. 10 is an explanatory diagram of an NT characteristic and an IT characteristic in an output limiting example of the embodiment.

Limitation by PWM control may be also performed so that number of rotations does not exceed a predetermined number of rotations while measuring only number of rotations. FIG. 10 shows the case that a maximum number of rotations is reduced.

When the motor (M) is not a brush motor but a brushless motor, an output limitation may be performed by the following control.

That is, regarding driving a three-phase brushless motor, there are: 120° energization in which an electric current in one phase of UVW phases does not flow; overwrap energization in which energization time period is longer than that of 120° energization and overwrap time period (in all the UVW phases, electric current flows for the time period) is provided before or after commutation; a sine wave drive; and the like. Motor's output and efficiency are improved in the order of the 120° energization<the overwrap energization<the sine wave drive, because of more approaching motor's induced voltage waveform. In addition, in the 120° energization and the overwrap energization, an output is increased by switching to the 120° energization in the proximity of stalling torque.

In addition, an output and efficiency are changed by lead-angle control, and an output is improved in the case of large lead-angle as compared with no lead-angle or less lead-angle. Efficiency by the lead-angle control is increased in the order of the 120° energization<the overwrap energization<the sine wave drive. The lead-angle control is disclosed in, for example, Japanese Patent Application Number 2003-200363 or the like, and accordingly is not described herein.

Therefore, by switching the aforementioned drive methods, energization angles or lead-angles in response to a type of an attached battery pack 2, it is possible to limit an output when a battery pack 2 of a high voltage is attached. For example, a configuration is set such that when a battery pack 2 of a low voltage is attached, a large output is obtained by setting the overwrap energization of a large overlap amount (energization angle) and a large lead-angle. A configuration is set such that when a battery pack 2 of a high voltage is attached, a small output is obtained by setting the 120° energization or the overwrap energization of a small overlap amount, and a small lead-angle or no lead-angle. According to such control, it is possible to move an output in attachment of a battery pack 2 of a high voltage closer to an output in attachment of a battery pack 2 of a low voltage.

The limitation may be added by overwrap-energization-angle control or lead-angle control when a motor (M) load is large, without unnecessary control by overwrap-energization-angle control or lead-angle control when a motor (M) load is low.

For example, a table of voltage and electric current is previously prepared, and a position of the NT characteristic or the IT characteristic is judged based on the table, and the limitation is added by overwrap-energization-angle control or lead-angle control in order to limit an electric current with respect to a voltage. Or a table of electric current and number of revolutions is previously prepared, and a position of the NT characteristic or the IT characteristic is judged based on the table, and the limitation is added by overwrap-energization-angle control or lead-angle control in order to limit an electric current with respect to number of revolutions.

Figure 11:
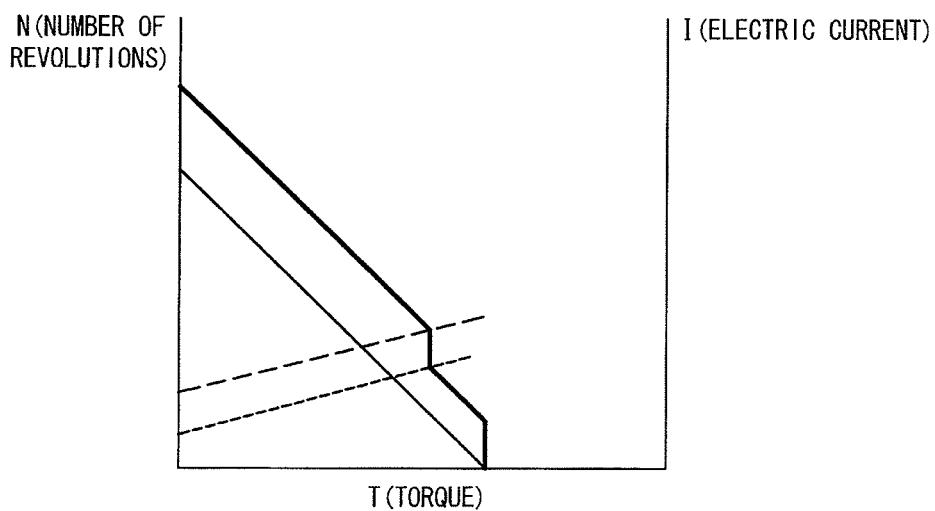
FIG. 11 is an explanatory diagram of an NT characteristic and an IT characteristic in an output limiting example of the embodiment.

The aforementioned limitation may be performed only when a temperature detected with the temperature sensor (TS) exceeds a predetermined value. FIG. 11 shows the case that an output limitation is performed by overwrap-energization-angle control or lead-angle control in order to repress heat generation by a high load when a battery pack 2 of a high voltage is attached, and operation is stopped when the load is further increased.

It is preferable that an output limitation by overwrap-energization-angle control or lead-angle control for a high load in attachment of a battery pack 2 of a high voltage should be limited to an electric current or a torque having the same level as that in use of a battery pack 2 of a low voltage.

Limitation of load current, upper limit of torque, or maximum number of revolutions as shown in FIG. 8, 9 or 10 can be performed by limitation by overwrap-energization-angle control or lead-angle control. The aforementioned limitation may be performed only when temperature is high.

As regarding prevention of heat generation and the like by a long-time drive when a battery pack 2 of a compliant rated output voltage is attached, a continuous drive time of the motor (M) may be limited at a point of time when it is judged that a rated output voltage of an attached battery pack 2 is higher than the compliant rated output voltage.

In a configuration, identification information of battery packs 2 further includes rated output voltage and rating capacity information of battery packs 2; and when a multiplication value of a rated output voltage and a rating capacity of an attached battery pack 2 is equal to or less than a predetermined value, the battery pack 2 is allow to supply power for motor drive; and when the multiplication value exceeds the predetermined value, the motor (M) is not driven even if the trigger switch (SW) is operated. In addition, it is preferable that when an unusable battery pack 2 is attached, that is informed through a communication means.

Figure 12:
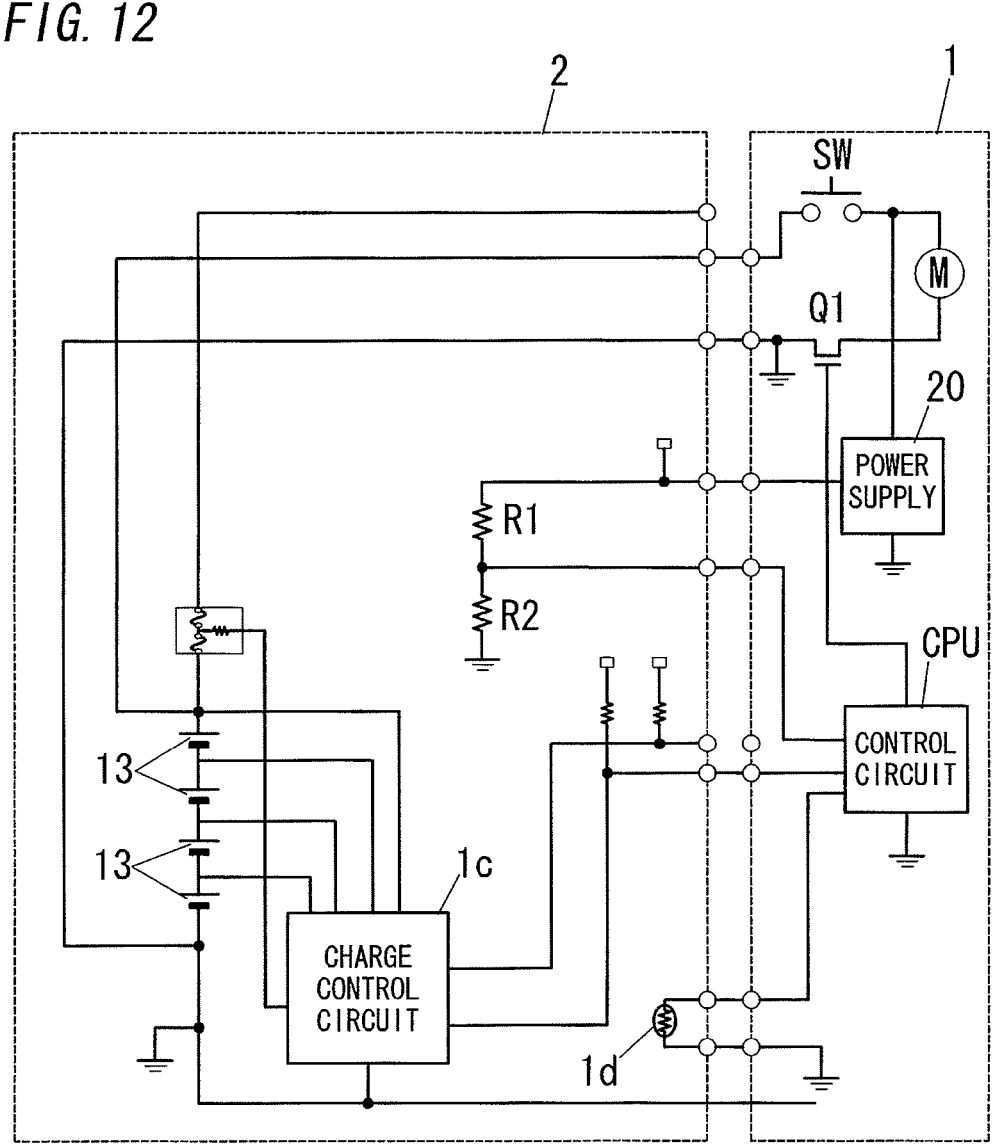
FIG. 12 is a block diagram of an example.

FIG. 12 shows a discrimination example of battery packs 2. In this example, in order to precisely perform discrimination by a resistance value of the resistor (R2) irrespective of a battery pack's (2) output voltage, the tool body 1 is provided with a constant-voltage (5V) power supply 20, and the constant-voltage power supply 20 applies the voltage to the resistor 20.

Figure 13:
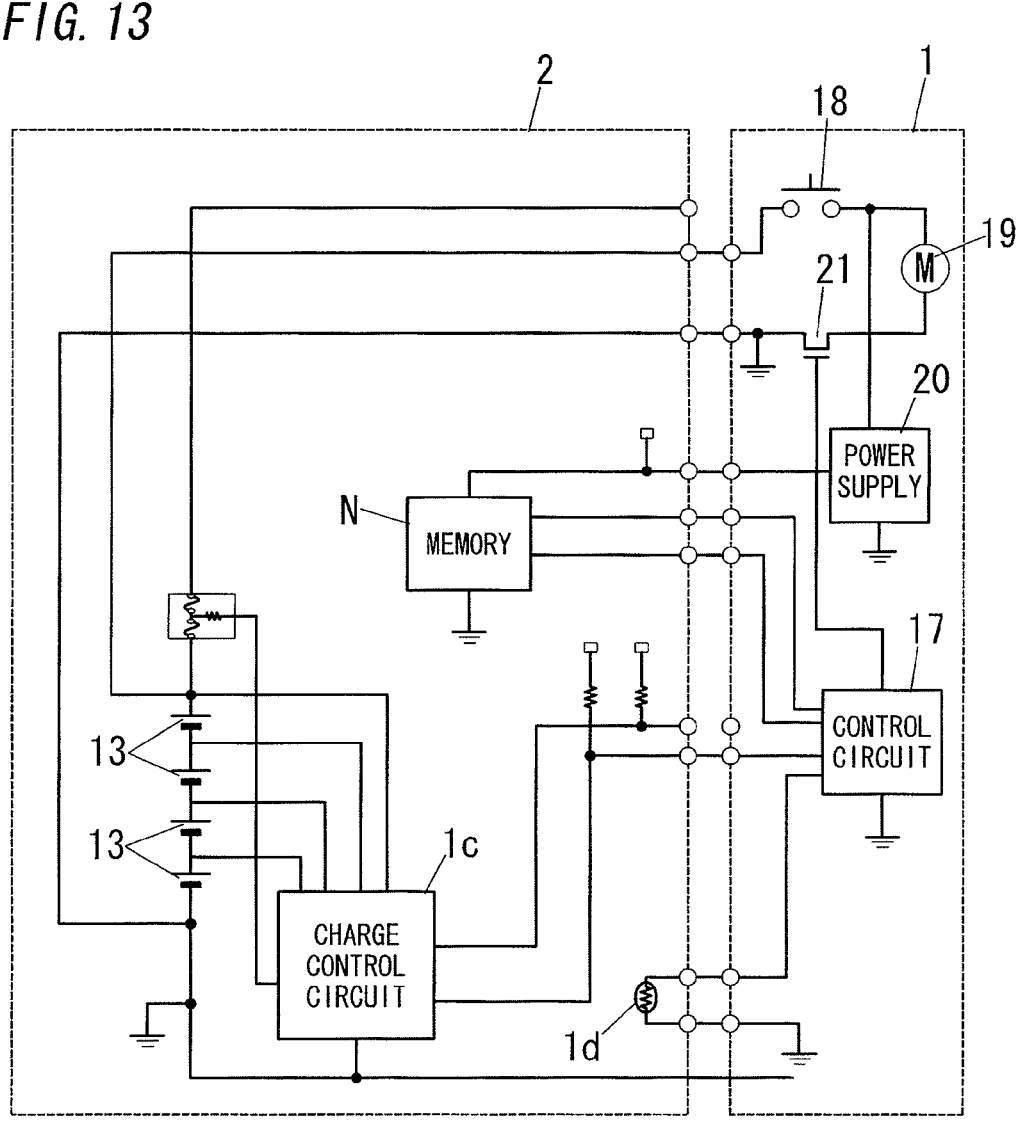
FIG. 13 is a block diagram of an example.

FIG. 13 shows an example that the control circuit (CPU) reads out an identification code stored in a nonvolatile memory (N) located at a battery pack 2, thereby performing a discrimination of the battery pack 2.

In each of the aforementioned examples, the number of the same kind of battery cells 13 connected in series in each of battery packs 2 is different from each other, but battery packs 2 each of which has different type of battery cells 13 may be capable of being attached and used as well. For example, a battery pack 2 which has nickel hydride battery cells and a rated output voltage of 15.6V or 16.8V may be capable of being attached and used with respect to the tool body 1 of an electric power tool of which compliant power supply is a battery pack 2 which has lithium-ion battery cells and a rated output voltage of 14.4V. In addition, a battery pack 2 which has lithium-ion battery cells 14 and a rated output voltage of 14.4V may be capable of being used for the tool body 1 of which compliant power supply is a battery pack 2 which has nickel hydride battery cells and a rated output voltage of 12V. As a matter of course, different battery packs 2 having rated output voltages lower than a compliant rated output voltage may be capable of being used.

Although the present invention has been described with reference to certain preferred embodiments, numerous modifications and variations can be made by those skilled in the art without departing from the true spirit and scope of this invention, namely claims.

The invention claimed is:

1. An electric power tool, comprising a battery pack, and a tool body configured so that the battery pack is detachably attached to the tool body,
   wherein the tool body is configured to be joined to:
   any one of a plurality of types of battery packs having different rated output voltages; or
   a battery pack having a rated output voltage higher than a rated output voltage compliant to the tool body, of said plurality of types of battery packs,
   wherein a battery pack attached to the tool body is configured to supply electric power to the tool body side,
   wherein in each of said plurality of types of battery packs, one or more battery cells are connected in series or parallel and the number of battery cells connected in series is different from each other, thereby the packs having different rated output voltages,
   wherein said tool body comprises a housing having an attached part to which said battery pack is detachably attached,
   wherein said tool body is provided, in the housing, with:
   a motor as a drive source;
   a drive part configured to be driven with the motor;
   a switch as an operation input part connected to said battery pack through battery terminals; and
   a control circuit configured to perform a drive control of said motor in response to an operation of the switch,
   wherein said attached part of the tool body is configured to be joined to:
   a battery pack having a rated output voltage compliant to a characteristic of the motor in the tool body, of said plurality of types of battery packs; and also
   another battery pack having a first rated output voltage higher than the rated output voltage compliant to the characteristic of the motor in the tool body, of said plurality of types of battery packs,
   the battery pack joined to the attached part being configured to supply electric power to the tool body side through said battery terminals,
   wherein said attached part of the tool body is further configured to prohibit a battery pack, having a second rated output voltage higher than the rated output voltage compliant to the characteristic of the motor in the tool body by at least a predetermined voltage difference, from being joined to the attached part, the second rated output voltage being higher than the first rated output voltage.

2. The electric power tool of claim 1,
   wherein said attached part of the tool body is further configured to be joined to a battery pack having a rated output voltage lower than the rated output voltage compliant to the characteristic of the motor in the tool body,
   the battery pack joined to the attached part being configured to supply electric power to the tool body side through said battery terminals.

3. The electric power tool of claim 1, wherein
   wherein said battery pack comprises a battery cell of a lithium-ion battery,
   wherein a battery pack capable of being joined to the attached part of the tool body is:
   a battery pack having the rated output voltage compliant to the characteristic of the motor in the tool body; and
   a battery pack having a rated output voltage, a difference between the rated output voltage and the rated output voltage compliant to the characteristic of the motor in the tool body being a voltage of one battery cell.

4. The electric power tool of claim 1,
wherein said battery pack comprises an attachment part having a plurality of engaging parts which are configured to be mechanically joined to a plurality of engaged parts of the attached part of the tool body, respectively,
wherein said engaging parts of the attachment part comprise insert limiting parts configured to allow the engaged parts to be inserted into the engaging parts only in a direction that the attachment part of the battery pack and the attached part of the tool body are pressed to each other.

5. The electric power tool of claim 4,
wherein at least one of the engaging parts comprises different dimension in accordance with rated output voltages of battery packs, and at least one of the engaged parts comprises different dimension in accordance with compliant battery packs to tool bodies, thereby limiting battery packs joined to said tool body.

6. An electric power tool, comprising a battery pack, and a tool body configured so that the battery pack is detachably attached to the tool body,
wherein the tool body is configured to be joined to:
any one of a plurality of types of battery packs having different rated output voltages; or
a battery pack having a rated output voltage higher than a rated output voltage compliant to the tool body, of said plurality of types of battery packs,
wherein a battery pack attached to the tool body is configured to supply electric power to the tool body side,
wherein said electric power tool is included in a plurality of types of electric power tools which comprise:
said plurality of types of battery packs, in each of which one or more battery cells are connected in series or parallel and the number of battery cells connected in series is different from each other, thereby the packs having different rated output voltages; and
a plurality of tool bodies each of which comprises a housing having an attached part to which said battery pack is detachably attached,
wherein each of the tool bodies is provided, in its own housing, with:
a motor as a drive source;
a drive part configured to be driven with the motor;
a switch as an operation input part connected to said battery pack through battery terminals; and
a control circuit configured to perform a drive control of said motor in response to an operation of the switch,
wherein the tool bodies comprise motors having different voltage characteristics, each attached part of the tool bodies being configured to be joined to:
a battery pack of a rated output voltage compliant to a characteristic of the motor built in its own tool body, of said plurality of types of battery packs; and also
another battery pack having a first rated output voltage higher than the rated output voltage compliant to the characteristic of the motor built in its own tool body, of said plurality of types of battery packs,
the battery pack joined to the attached part being configured to supply electric power to the tool body side through said battery terminals,
wherein said attached part of the tool body is further configured to prohibit a battery pack, having a second rated output voltage higher than the rated output voltage compliant to the characteristic of the motor built in its own tool body by at least a predetermined voltage difference, from being joined to the attached part, the second rated output voltage being higher than the first rated output voltage.

7. The electric power tool of claim 6,
wherein said attached part of the tool body is further configured to be joined to a battery pack having a rated output voltage lower than the rated output voltage compliant to the characteristic of the motor built in its own tool body,
the battery pack joined to the attached part being configured to supply electric power to the tool body side through said battery terminals.

8. The electric power tool of claim 6, wherein
wherein said battery pack comprise a battery cell of a lithium-ion battery,
wherein a battery pack capable of being joined to the attached part of the tool body is:
a battery pack having a rated output voltage compliant to the characteristic of the motor built in its own tool body; and
a battery pack having a rated output voltage, a difference between the rated output voltage and the rated output voltage compliant to the characteristic of the motor built in its own tool body being a voltage of one battery cell.

9. The electric power tool of claim 6,
wherein said battery pack comprises an attachment part having a plurality of engaging parts which are configured to be mechanically joined to a plurality of engaged parts of the attached part of the tool body, respectively,
wherein said engaging parts of the attachment part comprise insert limiting parts configured to allow the engaged parts to be inserted into the engaging parts only in a direction that the attachment part of the battery pack and the attached part of the tool body are pressed to each other.

10. The electric power tool of claim 9,
wherein at least one of the engaging parts comprises different dimension in accordance with rated output voltages of battery packs, and at least one of the engaged parts comprises different dimension in accordance with compliant battery packs to tool bodies, thereby limiting battery packs joined to said tool body.

* * * * *